(12) United States Patent  (10) Patent No.: US 7,799,198 B2
Nanjundiah et al.  (45) Date of Patent: Sep. 21, 2010

(54) CHLORINE DIOXIDE SOLUTION GENERATOR WITH TEMPERATURE CONTROL CAPABILITY

(75) Inventors: Chenniah Nanjundiah, San Diego, CA (US); Larry L. Hawn, Laguna Niguel, CA (US); Jeffrey M. Dotson, Fort Worth, TX (US)

(73) Assignee: Pureline Treatment Systems, LLC, Irvine, CA (US)

( * ) Notice: Subject to any disclaimer, the term of this patent is extended or adjusted under 35 U.S.C. 154(b) by 1448 days.

(21) Appl. No.: 11/145,398

(22) Filed: Jun. 3, 2005

(65) Prior Publication Data

US 2006/0022360 A1 Feb. 2, 2006

Related U.S. Application Data

(63) Continuation-in-part of application No. 10/902,681, filed on Jul. 29, 2004.

(51) Int. Cl.
  *C25B 1/26* (2006.01)
(52) U.S. Cl. .................. 205/499; 205/500; 204/233; 204/234
(58) Field of Classification Search .................. 422/305; 205/499, 500; 423/477, 478; 204/233, 234, 204/263
See application file for complete search history.

(56) References Cited

U.S. PATENT DOCUMENTS 4,276,262 A  6/1981  Cowley
4,336,228 A  6/1982  Cowley
5,006,326 A  4/1991  Mayurnik et al.
5,792,441 A  8/1998  Paleologou et al.
5,968,454 A  10/1999  Deacon et al.
6,051,135 A  4/2000  Lee et al.
6,171,558 B1  1/2001  Simpson
6,274,009 B1  8/2001  Krafton et al.
6,468,479 B1  10/2002  Mason et al.
7,452,511 B2 *  11/2008  Schmitz et al. ............. 422/129
2005/0061741 A1  3/2005  Mainz et al.

FOREIGN PATENT DOCUMENTS

WO  WO-02/14216 A  2/2002

* cited by examiner

*Primary Examiner*—Sean E Conley
(74) *Attorney, Agent, or Firm*—McAndrews, Held & Mallloy, Ltd.

(57) ABSTRACT

A chlorine dioxide solution generator includes a chlorine dioxide gas source and an absorption loop for effecting the dissolution of chlorine dioxide into a liquid stream. A gas transfer assembly is interposed between the chlorine dioxide gas source and the absorption loop. The gas transfer assembly includes a gas transfer pump and an exhaust manifold assembly. The exhaust manifold assembly includes a manifold conduit defining an interior volume for directing the pressurized chlorine dioxide gas stream from the pump outlet to the absorption loop. The manifold conduit interior volume is sufficiently large to inhibit chlorine dioxide decomposition in the pressurized chlorine dioxide gas stream by induce a pressurized chlorine dioxide gas stream temperature within the manifold conduit of less than about 163° F. (73° C.).

8 Claims, 8 Drawing Sheets

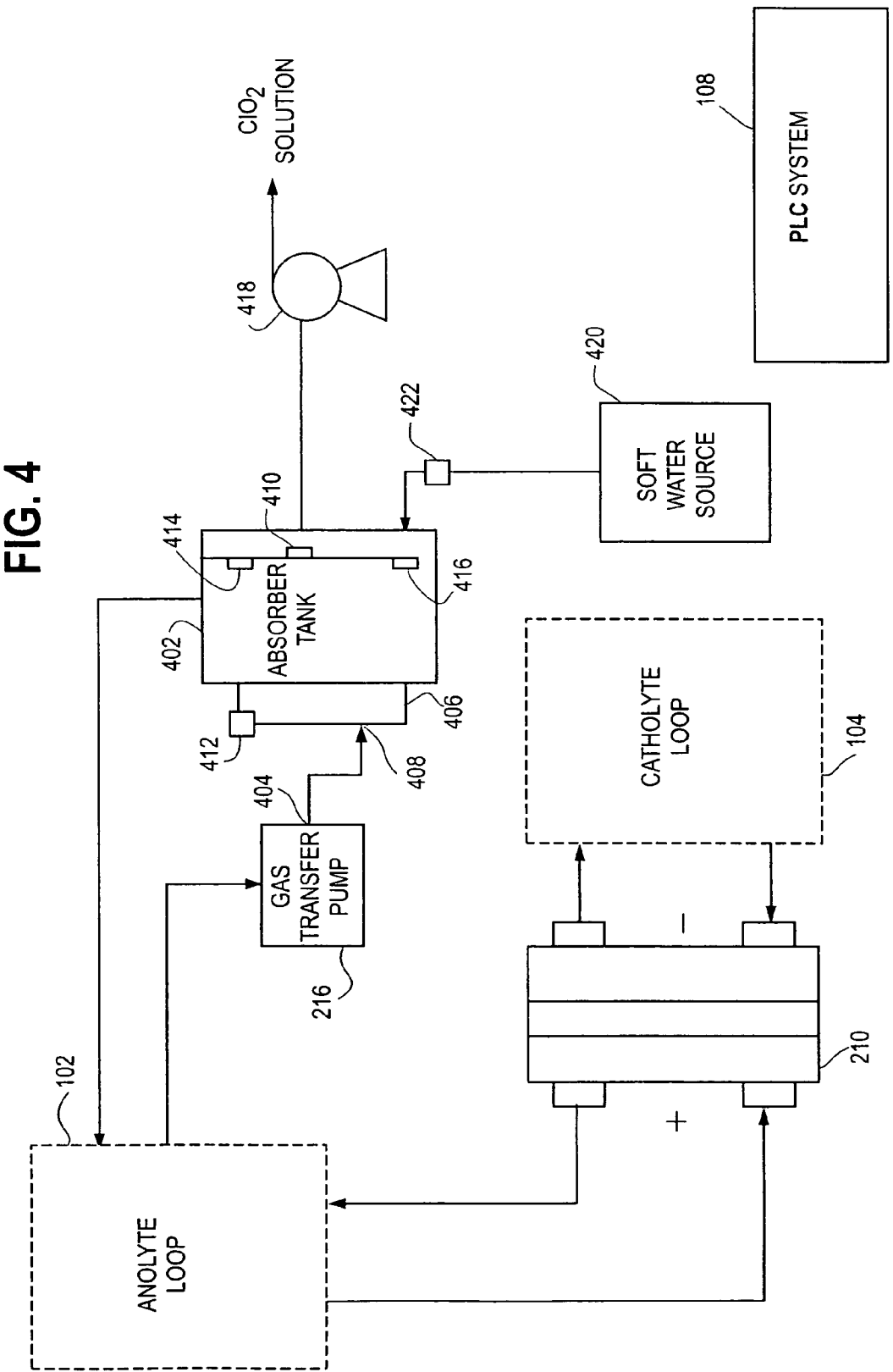

ABSORPTION LOOP

CHLORINE DIOXIDE SOLUTION GENERATOR WITH TEMPERATURE CONTROL CAPABILITY

CROSS-REFERENCE TO RELATED APPLICATION(S)

This application is a continuation-in-part of U.S. patent application Ser. No. 10/902,681 filed on Jul. 29, 2004, entitled "Chlorine Dioxide Solution Generator". The '681 application is hereby incorporated by reference herein in its entirety.

FIELD OF THE INVENTION

The present invention relates generally to chlorine dioxide generators and to the use of such generators in water treatment systems. More particularly, the present invention relates to a chlorine dioxide generator for producing a chlorine dioxide solution, in which the temperature of the chlorine dioxide stream is controlled to reduce or avoid decomposition of chlorine dioxide in the stream.

BACKGROUND OF THE INVENTION

Chlorine dioxide ($ClO_2$) has many industrial and municipal uses. When produced and handled properly, $ClO_2$ is an effective and powerful biocide, disinfectant and oxidizer.

$ClO_2$ is also used extensively in the pulp and paper industry as a bleaching agent, but is gaining further support in such areas as disinfections in municipal water treatment. Other end-uses can include as a disinfectant in the food and beverage industries, wastewater treatment, industrial water treatment, cleaning and disinfections of medical wastes, textile bleaching, odor control for the rendering industry, circuit board cleansing in the electronics industry, and uses in the oil and gas industry.

In water treatment applications, $ClO_2$ is primarily used as a disinfectant for surface waters with odor and taste problems. It is an effective biocide at low concentrations and over a wide pH range. $ClO_2$ is desirable because when it reacts with an organism in water, chlorite results, which studies to date have shown does not pose a significant adverse risk to human health. The use of chlorine, on the other hand, can result in the creation of chlorinated organic compounds when treating water. Such chlorinated organic compounds are suspected to increase cancer risk.

Producing $ClO_2$ gas for use in a $ClO_2$ water treatment process is desirable because there is greater assurance of $ClO_2$ purity when in the gas phase. $ClO_2$ is, however, unstable in the gas phase and will readily undergo decomposition into chlorine gas ($Cl_2$), oxygen gas ($O_2$), and heat. The high reactivity of $ClO_2$ generally requires that it be produced and used at the same location. $ClO_2$ is, however, soluble and stable in an aqueous solution.

The production of $ClO_2$ can be accomplished both by electrochemical and reactor-based chemical methods. Electrochemical methods have an advantage of relatively safer operation compared to reactor-based chemical methods. In this regard, electrochemical methods employ only one precursor, namely, a chlorite solution, unlike the multiple precursors that are employed in reactor-based chemical methods. Moreover, in reactor-based chemical methods, the use of concentrated acids and chlorine gas poses a safety concern.

Electrochemical cells are capable of carrying out selective oxidation reaction of chlorite to $ClO_2$ The selective oxidation reaction product is a solution containing $ClO_2$. To further purify the $ClO_2$ gas stream, the gas stream is separated from the solution using a stripper column. In the stripper column, air is passed from the bottom of the column to the top while the $ClO_2$ solution travels from top to the bottom. Pure $ClO_2$ is exchanged from solution to the air. Suction of air is usually accomplished using an eductor, as described in copending and co-owned application Ser. No. 10/902,681, of which the present application is a continuation-in-part.

As described in the '681 application, $ClO_2$ can be prepared a number of ways, generally via a reaction involving either chlorite ($ClO_2$—) or chlorate ($ClO_3$—) solutions. The $ClO_2$ created through such a reaction is often refined to generate $ClO_2$ gas for use in the water treatment process. The $ClO_2$ gas is then educed into the water selected for treatment. Eduction occurs where the $ClO_2$ gas, in combination with air, is mixed with the water selected for treatment.

As further described in the '681 application, for many water treatment systems, the eduction process is effective to introduce $ClO_2$ gas directly into the process water. An operational problem can occur, however, when air is simultaneously introduced into a water system while educing the $ClO_2$ gas. A significant corrosion potential results from oxygen in air being added into the system.

Another problem can occur when introducing $ClO_2$ gas into a pressurized water system. Treating water in pressurized systems can be difficult when using educed $ClO_2$ gas, since high-pressure booster pumps may be needed along with high-performance eductors. This not only increases cost, but also raises maintenance concerns, since high-performance eduction systems can be unreliable as operating pressures near or above 30 to 50 pounds per square inch (psi)(206.8 to 344.7 kilopascal (kPa)).

The foregoing eductor-based method is less effective, however, in systems in which a $ClO_2$ stream is directed against a head pressure. To overcome this deficiency, a vacuum gas transfer pump can be employed instead of the eductor described in the '681 application. The size and capacity of the vacuum gas transfer pump are preferably determined by parameters associated with safe, efficient and reliable operation of the generator. In this regard, it has been determined that, for safe, efficient and reliable operation of the generator, a $ClO_2$ concentration of less than about 10 percent by volume of a stream comprising $ClO_2$ in air, the lower decomposition limit, is preferred. To further increase the safety margin of the generator, a $ClO_2$ concentration of less than about 5 percent by volume of a stream comprising $ClO_2$ in air is more desirable.

As the amount of $ClO_2$ produced by the generator increases, the amount of air required for the effective operation of the stripper column also increases. The production range of the generator therefore determines the size of the vacuum gas transfer pump. As the pump size increase the velocity of the mixed air/$ClO_2$ stream exiting the pump increases. Consequently, the temperature of the gas mixture increases.

It is known that $ClO_2$ is unstable and capable of decomposing, in which $ClO_2$ undergoes an exothermic reaction to form chlorine and oxygen. In fact, and as described in more detail below, an operating temperature greater than about 163° F. (73° C.) can result in potentially hazardous and less efficient operation of the generator. In the present technique, in which the $ClO_2$ solution generator has temperature control capability, the operating temperature can be reduced and maintained below the level at which the exothermic reaction to form chlorine and oxygen causes the $ClO_2$ generation process to become hazardous and less efficient.

SUMMARY OF THE INVENTION

A chlorine dioxide solution generator comprises a $ClO_2$ gas source, an absorption loop for effecting the dissolution of $ClO_2$ into a liquid stream, the absorption loop fluidly connected to the $ClO_2$ gas source, and a gas transfer assembly interposed between the $ClO_2$ gas source and the absorption loop. The gas transfer assembly comprises:

(1) a gas transfer pump having at least one inlet port for receiving a $ClO_2$ gas stream from the $ClO_2$ gas source and at least one outlet port for discharging a pressurized $ClO_2$ gas stream; and (2) an exhaust manifold assembly extending from the at least one gas transfer pump outlet port.

The exhaust manifold assembly comprises at least one manifold conduit defining an interior volume for directing the pressurized $ClO_2$ gas stream from the at least one gas transfer pump outlet port to the absorption loop. The at least one manifold conduit interior volume is sufficiently large to inhibit $ClO_2$ decomposition in the pressurized $ClO_2$ gas stream.

In a preferred chlorine dioxide solution generator, the at least one manifold conduit interior volume is sufficiently large to induce a pressurized $ClO_2$ gas stream temperature within the at least one manifold conduit of less than about 163° F. (73° C.).

In a preferred chlorine dioxide solution generator, the gas transfer pump has first and second inlet ports for receiving first and second $ClO_2$ gas streams from the $ClO_2$ gas source. The gas transfer pump has first and second outlet ports for discharging first and second pressurized $ClO_2$ gas streams. The discharge manifold assembly comprises first and second manifold conduits defining an aggregate conduit interior volume for directing the first and second pressurized $ClO_2$ gas streams, respectively, from the gas transfer pump to the absorption loop. The aggregate manifold conduit interior volume is sufficiently large to inhibit $ClO_2$ decomposition in the pressurized $ClO_2$ gas stream.

In a preferred chlorine dioxide solution generator, the first and second inlet ports each has an inlet port conduit extending therefrom for receiving first and second $ClO_2$ gas streams from the $ClO_2$ gas source. The first and second outlet ports each has an outlet port conduit extending therefrom for discharging first and second pressurized $ClO_2$ gas streams. The exhaust manifold assembly comprises first and second manifold conduits defining an aggregate conduit interior volume for directing the first and second pressurized $ClO_2$ gas streams, respectively, from the gas transfer pump to the absorption loop. The aggregate manifold conduit interior volume is sufficiently large to inhibit $ClO_2$ decomposition in the pressurized $ClO_2$ gas stream.

In a preferred chlorine dioxide solution generator, the first and second inlet ports each has an inlet port conduit extending therefrom for receiving first and second $ClO_2$ gas streams from the $ClO_2$ gas source. The first and second outlet ports each has a pair of outlet port conduits extending therefrom for discharging two pairs of pressurized $ClO_2$ gas streams. The exhaust manifold assembly comprises at least one manifold conduit defining an aggregate conduit interior volume for directing the first and second pressurized $ClO_2$ gas streams, respectively, from the gas transfer pump to the absorption loop. The aggregate manifold conduit interior volume is sufficiently large to inhibit $ClO_2$ decomposition in the pressurized $ClO_2$ gas stream. The exhaust manifold assembly preferably comprises a single manifold conduit defining an interior volume for directing the two pairs of pressurized $ClO_2$ gas streams from the gas transfer pump to the absorption loop. The interior volume is sufficiently large to inhibit $ClO_2$ decomposition in the pressurized $ClO_2$ gas stream.

In preferred embodiments of the chlorine dioxide solution generator, the outlet port conduits are preferably formed from a material selected from the group consisting of polytetrafluoroethylene (PTFE; commercially available from DuPont under the trade name Teflon®), polychlorotrifluoroethylene, chlorinated poly(vinyl chloride), titanium and other metals having a melting point greater than about 140° F. (60° C.).

In preferred embodiments of the chlorine dioxide solution generator, a ratio of the cross-sectional diameter of the at least one manifold conduit to the cross-sectional diameter of the at least one gas transfer pump outlet port is greater than 1.

In preferred embodiments of the chlorine dioxide solution generator, the exhaust manifold assembly has a coolant fluid stream in thermal contact therewith. In operation, the coolant fluid stream further inhibits $ClO_2$ decomposition in the pressurized $ClO_2$ gas stream. The coolant fluid stream is preferably in thermal contact with the at least one manifold conduit. The thermal contact of the coolant fluid stream with the at least one manifold conduit further induces a pressurized $ClO_2$ gas stream temperature within the at least one manifold conduit of less than about 163° F. (73° C.).

A method of generating a chlorine dioxide solution comprises:

(a) providing a source of $ClO_2$ gas;

(b) effecting the dissolution of $ClO_2$ into a liquid stream by employing an absorption loop fluidly connected to the $ClO_2$ gas source;

(c) interposing a gas transfer pump between the $ClO_2$ gas source and the absorption loop, the gas transfer pump having at least one inlet port for receiving a $ClO_2$ gas stream from the $ClO_2$ gas source and at least one outlet port for discharging a pressurized $ClO_2$ gas stream;

(d) interposing an exhaust manifold assembly between the gas transfer pump outlet port and the absorption loop, the exhaust manifold assembly comprising at least one manifold conduit defining an interior volume for directing the pressurized $ClO_2$ gas stream from the at least one gas transfer pump outlet port to the absorption loop; and (e) inhibiting $ClO_2$ decomposition in the pressurized $ClO_2$ gas stream by effecting a volumetric increase between the at least one gas transfer pump outlet port and the at least one manifold conduit.

In a preferred embodiments of the method, the volumetric increase induces a pressurized $ClO_2$ gas stream temperature within the at least one manifold conduit of less than about 163° F. (73° C.).

BRIEF DESCRIPTION OF THE DRAWINGS

FIG. 4 is a process flow diagram of an absorption loop of a $ClO_2$ solution generator of the type described in the '681 application.

DETAILED DESCRIPTION OF PREFERRED EMBODIMENT(S)

Figure 1:
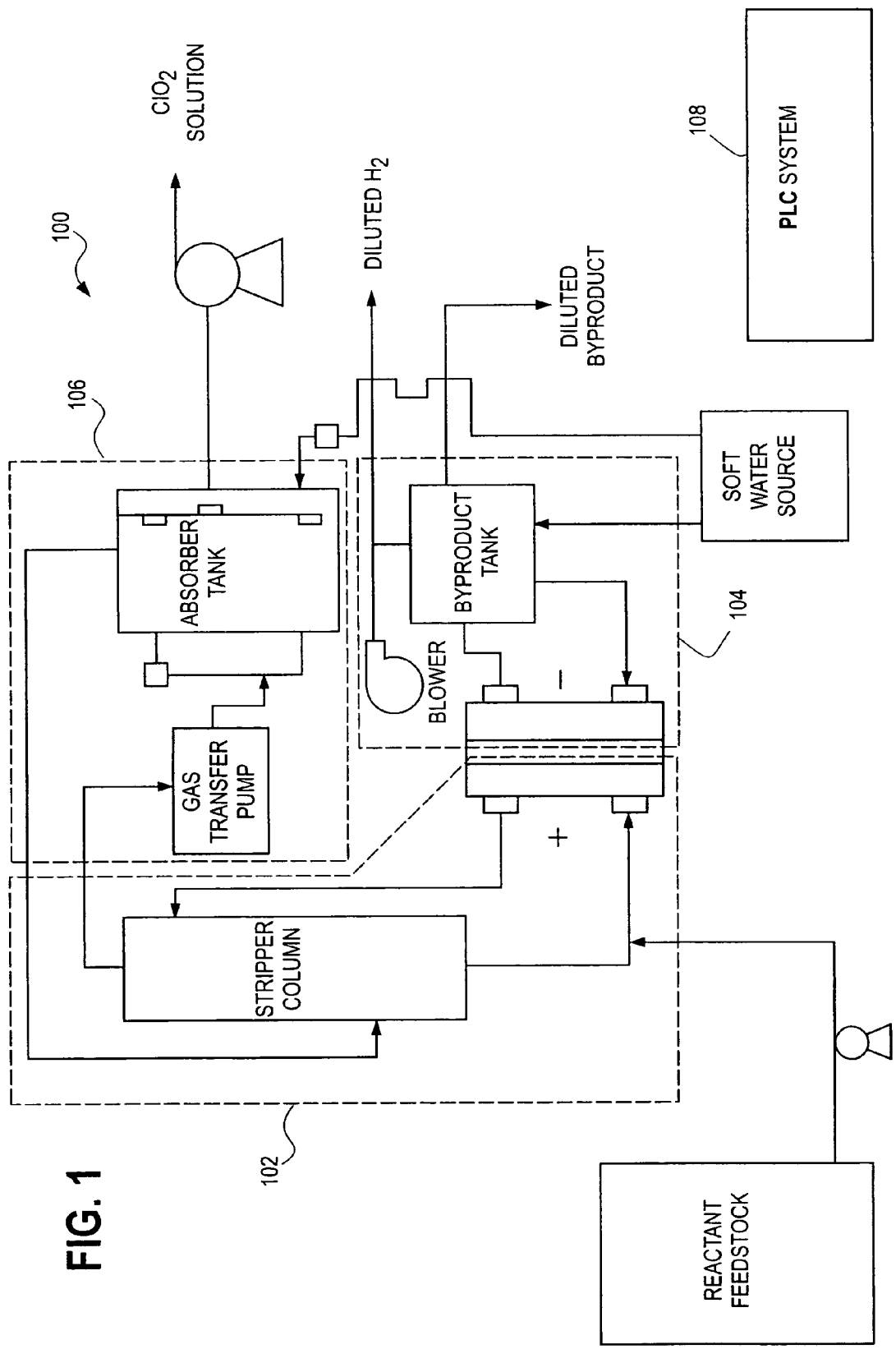
FIG. 1 is a process flow diagram of a $ClO_2$ solution generator of the type described in application Ser. No. 10/902,681.

FIG. 1 illustrates a process flow diagram of an embodiment of chlorine dioxide solution generator 100 of the type described in application Ser. No. 10/902,681. The process flow of FIG. 1 consists of three sub-processes including an anolyte loop 102, a catholyte loop 104, and an absorption loop 106. The purpose of anolyte loop 102 is to produce a $ClO_2$ gas by oxidation of chlorite, and the process can be referred to as a $ClO_2$ gas generator loop. The $ClO_2$ gas generator loop is essentially a $ClO_2$ gas source. Various sources of $ClO_2$ are available and known in the water treatment field. Catholyte loop 104 of the $ClO_2$ gas generator loop produces sodium hydroxide and hydrogen gas by reduction of water. Once the $ClO_2$ gas is produced in the $ClO_2$ gas generator loop, the $ClO_2$ gas is transferred to absorption loop 106 where the gas is further conditioned for water treatment end-uses. The process can be operated through a program logic control (PLC) system 108 that can include visual and/or audible displays.

In this application, the term "absorb" refers to the process of dissolving or infusing a gaseous constituent into a liquid, optionally using pressure to effect the dissolution or infusion. Here, $ClO_2$ gas, which is produced in the $ClO_2$ gas generator loop, is "absorbed" (that is, dissolved or infused) into an aqueous liquid stream directed through absorption loop 106.

Figure 2:
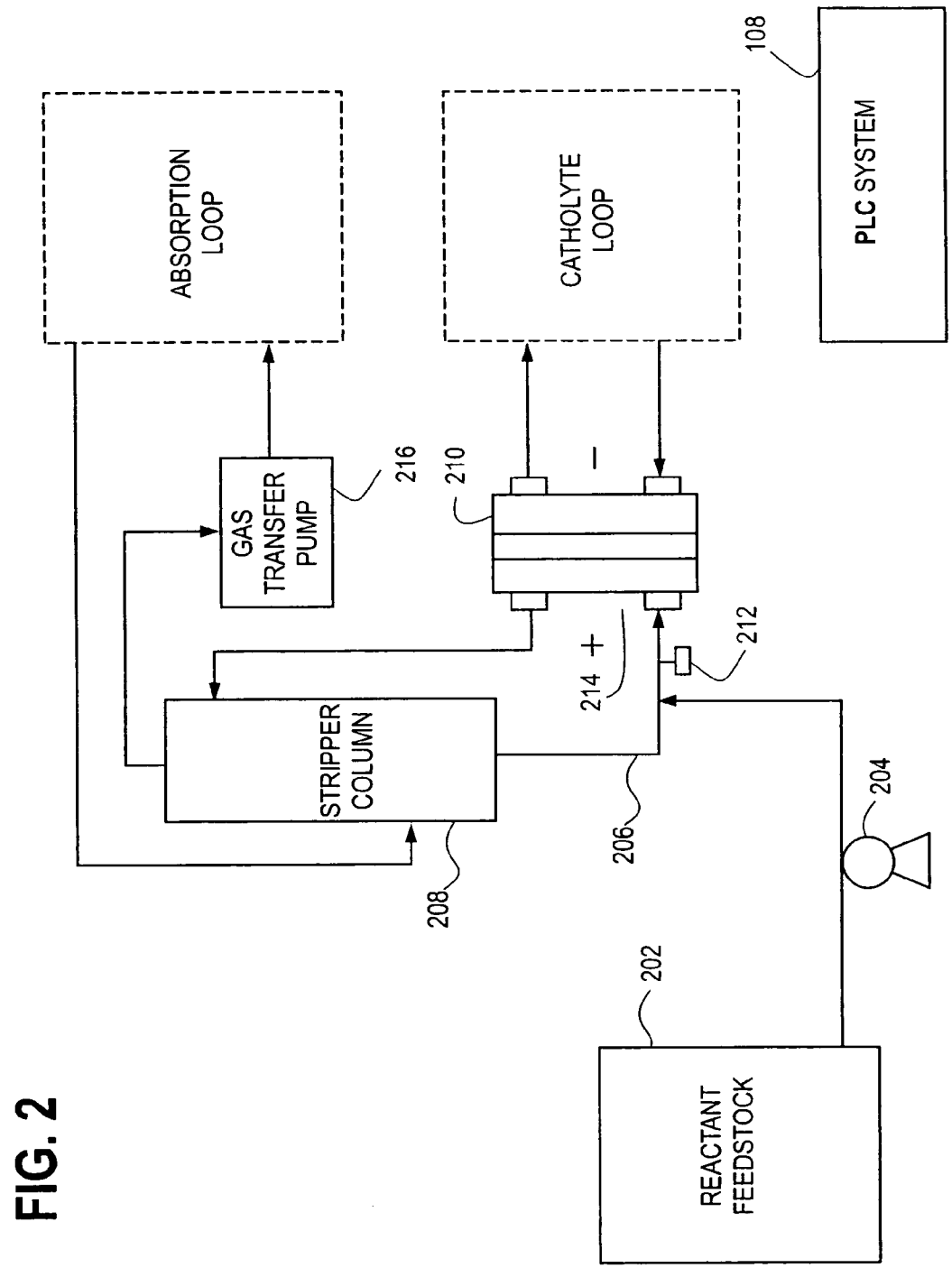
FIG. 2 is a process flow diagram of an anolyte loop of a $ClO_2$ solution generator of the type described in the '681 application.

FIG. 2 illustrates an anolyte loop 102 in an embodiment of chlorine dioxide solution generator 100 of the type described in the '681 application. The contribution of anolyte loop 102 to the $ClO_2$ solution generator is to produce a $ClO_2$ gas that is directed to absorption loop 106 for further processing. Anolyte loop 102 embodiment of FIG. 2 is for a $ClO_2$ gas produced using a reactant feedstock 202. In a preferred embodiment, a 25 percent by weight sodium chlorite (Na$ClO_2$) solution can be used as reactant feedstock 202. However, feedstock concentrations ranging from 0 percent to a maximum solubility (40 percent at 17° C. in the embodiment involving Na$ClO_2$), or other suitable method of injecting suitable electrolytes, can be employed.

The reactant feedstock 202 is connected to a chemical metering pump 204, which delivers the reactant feedstock 202 to a recirculating connection 206 in the anolyte loop 102. Recirculating connection 206 in anolyte loop connects a stripper column 208 to an electrochemical cell 210. The delivery of the reactant feedstock 202 can be controlled using PLC system 108. PLC system 108 can be used to activate chemical metering pump 204 according to signals received from a pH sensor 212. pH sensor 212 is generally located along recirculating connection 206. A pH set point can be established in PLC system 108, and once the set point is reached, the delivery of reactant feedstock 202 can either start or stop.

Reactant feedstock 202 is delivered to a positive end 214 of electrochemical cell 210 where the reactant feedstock is oxidized to form a $ClO_2$ gas, which is then dissolved in an electrolyte solution along with other side products. The $ClO_2$ solution with the side products is directed away from electrochemical cell 210 to the top of stripper column 208 where a pure $ClO_2$ is stripped off in a gaseous form from the other side products. Side products or byproducts can include chlorine, chlorates, chlorites and/or oxygen. The pure $ClO_2$ gas is then removed from stripper column 208 under a vacuum induced by gas transfer pump 216, or analogous gas or fluid transfer device (such as, for example, a vacuum-based device), where it is delivered to adsorption loop 106. The remaining solution is collected at the base of stripper column 208 and recirculated back across the pH sensor 212 where additional reactant feedstock 202 can be added. The process with the reactant feedstock and/or recirculation solution being delivered into positive end 214 of electrochemical cell 210 is then repeated.

As described in the '681 application, modifications to the anolyte loop process can be made that achieve similar results. As an example, an anolyte hold tank can be used in place of a stripper column. In such a case, an inert gas or air can be blown over the surface or through the solution to separate the $ClO_2$ gas from the anolyte. As another example, chlorate can be reduced to produce $ClO_2$ in a cathode loop instead of chlorite. The $ClO_2$ gas would then similarly be transferred to the absorption loop. In a further example, $ClO_2$ can be generated by purely chemical generators and transferred to an absorption loop for further processing.

Figure 3:
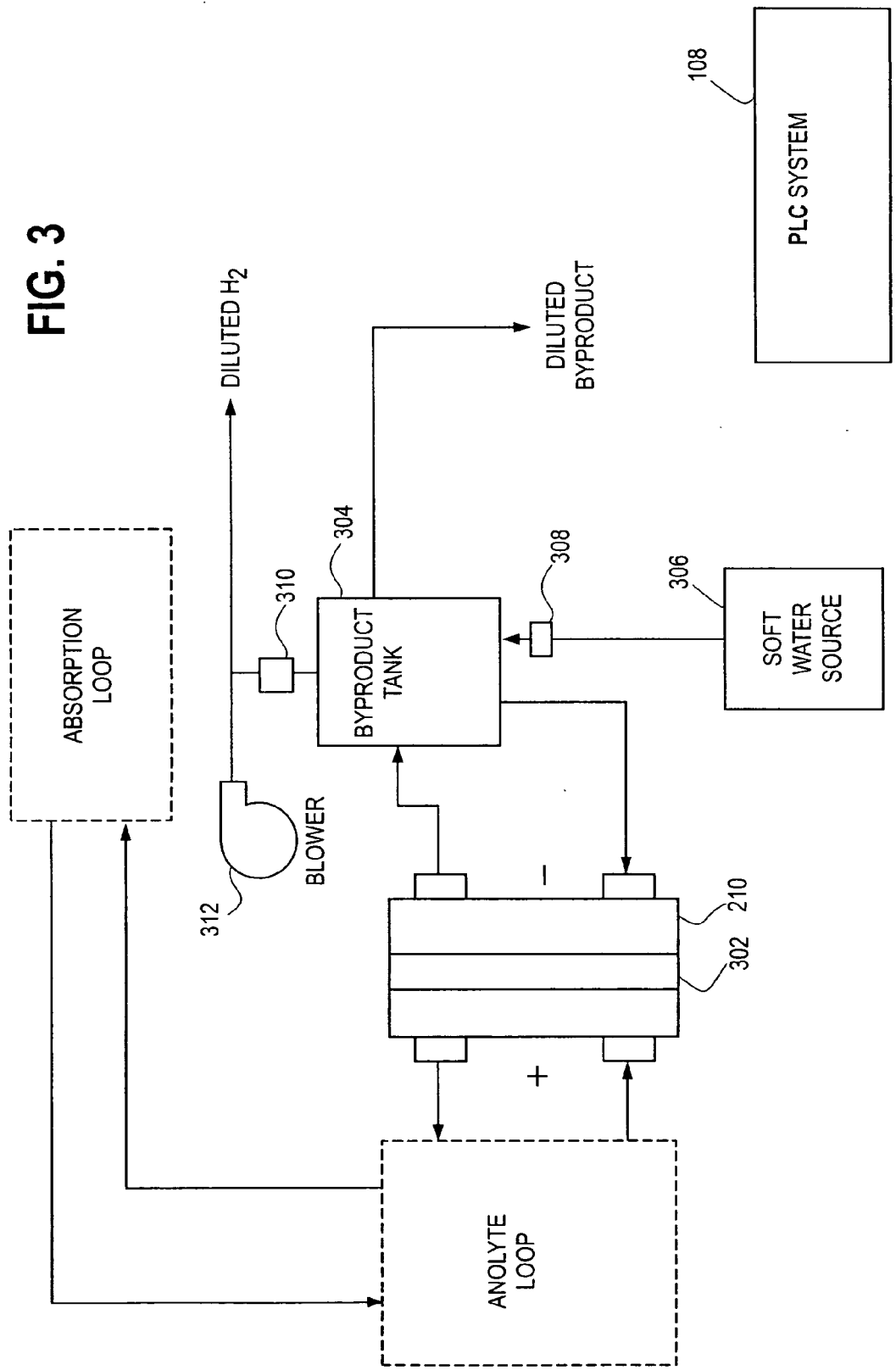
FIG. 3 is a process flow diagram of a catholyte loop of a $ClO_2$ solution generator of the type described in the '681 application.

FIG. 3 illustrates a catholyte loop 104 in an embodiment of a chlorine dioxide solution generator 100 of the type described in the '681 application. Catholyte loop 104 contributes to the chlorine dioxide solution generator 100 by handling byproducts produced from the electrochemical reaction of reactant feedstock 202 solution in anolyte loop 102. As an example, where a sodium chlorite (Na$ClO_2$) solution is used as reactant feedstock 202, sodium ions from the anolyte loop 102 migrate to catholyte loop 104 through a cationic membrane 302, in electrochemical cell 210, to maintain charge neutrality. Water in the catholyte is reduced to produce hydroxide and hydrogen ($H_2$) gas. The resulting byproducts in catholyte loop 104, in the example of an Na$ClO_2$ reactant feedstock, are sodium hydroxide (NaOH) and hydrogen gas. The byproducts are directed to a byproduct tank 304.

In an embodiment of catholyte loop 104 in the example of a Na$ClO_2$ reactant feedstock, a soft (that is, demineralized) water source 306 can be used to dilute the byproduct NaOH using a solenoid valve 308 connected between soft water source 306 and the byproduct tank 304. Solenoid valve 308 can be controlled with PLC system 108. In a preferred embodiment, PLC system 108 can use a timing routine that maintains the NaOH concentration in a range of 5 percent to 20 percent. When byproduct tank 304 reaches a predetermined level above the base of byproduct tank 304, the diluted NaOH byproduct above that level is removed from catholyte loop 104.

In the example of a Na$ClO_2$ reactant feedstock, catholyte loop 104 self circulates using the lifting properties of the $H_2$ byproduct gas formed during the electrochemical process and forced water feed from soft water source 306. The $H_2$ gas rises up in byproduct tank 304 where there is a hydrogen disengager 310. The $H_2$ gas can be diluted with air in hydrogen disengager 310 to a concentration of less than 0.5 percent.

The diluted H$_2$ gas can be discharged from catholyte loop 104 and chlorine dioxide solution generator 100 using a blower 312.

As described in the '681 application, in another embodiment, dilute sodium hydroxide can be fed instead of water to produce concentrated sodium hydroxide. Oxygen or air can also be used as a reductant instead of water to reduce overall operation voltage since oxygen reduces at lower voltage than water.

The reaction of anolyte loop 102 and catholyte loop 104 in the embodiment illustrated in FIGS. 2 and 3 is represented by the following net chemical equation:

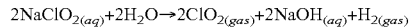
$$2NaClO_{2(aq)}+2H_2O \rightarrow 2ClO_{2(gas)}+2NaOH_{(aq)}+H_{2(gas)}$$

The NaClO$_2$ is provided by reactant feedstock 202 of anolyte loop 102. The NaOH and H$_2$ gas are byproducts of the reaction in catholyte loop 104. The ClO$_2$ solution along with the starting unreacted NaClO$_2$ and other side products are directed to the stripper column for separating into ClO$_2$ gas as part of anolyte loop 102 process. Chlorite salts other than NaClO$_2$ can be used in anolyte loop 102.

FIG. 4 illustrates an absorption loop 106 of an embodiment of a chlorine dioxide solution generator 100 of the type described in the '681 application. Absorption loop 106 processes the ClO$_2$ gas from anolyte loop 102 into a ClO$_2$ solution that is ready to be directed to the water selected for treatment.

ClO$_2$ gas is removed from stripper column 208 of anolyte loop 102 using gas transfer pump 216. In a preferred embodiment, a gas transfer pump 216 can be used that is "V" rated at 75 Torr (10 kPa) with a discharge rate of 34 liters per minute. The vacuum and delivery rate of gas transfer pump 216 can vary depending upon the free space in stripper column 208 and desired delivery rate of ClO$_2$ solution.

The ClO$_2$ gas removed from stripper column 208 using gas transfer pump 216 is directed to an absorber tank 402 of absorption loop 106. In a preferred embodiment, discharge side 404 of gas transfer pump 216 delivers ClO$_2$ gas into a 0.5-inch (13-mm) poly(vinyl chloride)(PVC) injection line 406 external to absorber tank 402. Injection line 406 is an external bypass for fluid between the lower to the upper portions of the absorption tank 402. A gas injection line can be connected to injection line 406 using a T-connection 408. Before ClO$_2$ gas is directed to absorber tank 402, the tank 402 is filled with water to approximately 0.5 inch (13 mm) below a main level control 410. Main level control 410 can be located below where injection line 406 connects to the upper portion of absorption tank 402. Introducing ClO$_2$ gas into injection line 406 can cause a liquid lift that pushes newly absorbed ClO$_2$ solution up past a forward-only flow switch 412 and into absorber tank 402. Flow switch 412 controls the amount of liquid delivered to absorber tank 402. Absorber tank 402 has a main control level 410 to maintain a proper tank level. In addition to main control level 410, safety control levels can be employed to maintain a high level 414 and low level 416 of liquid where main control level 410 fails. A process delivery pump 418 feeds ClO$_2$ solution from absorption tank 402 to the end process without including air or other gases. Process delivery pump 418 is sized to deliver a desired amount of water per minute. The amount of ClO$_2$ gas delivered to absorber tank 402 is set by the vacuum and delivery rate set by gas transfer pump 216.

PLC system 108 can provide a visual interface for the operator to operate the entire chlorine dioxide solution generator 100. PLC system 108 can automatically control the continuous operation and safety of the production of ClO$_2$ solution. PLC system 108 can set flow rates for anolyte loop 102 and catholyte loop 104. The safety levels of absorber tank 402 can also be enforced by PLC system 108. PLC system 108 can also control the power for achieving a desired current in an embodiment using an electrochemical cell 210. In a preferred embodiment, the current ranges from 0 to 100 amperes, although currents higher than this average are possible. The amount of current determines the amount of ClO$_2$ gas that is produced in anolyte loop 102. The current of the power supply can be determined by the amount of ClO$_2$ that is to be produced. PLC system 108 can also be used to monitor the voltage of electrochemical cell 210. In a preferred embodiment, electrochemical cell 210 can be shut down when the voltage exceeds a safe voltage level. In another preferred embodiment, 5 volts can be considered a safe voltage level.

As described in the '681 application, another operation that can be monitored with PLC system 108 is the temperature of electrochemical cell 210. If overheating occurs, PLC system 108 shuts down electrochemical cell 210. PLC system 108 can also monitor the pH of the anolyte using a pH sensor 212 (shown in FIG. 2). During operation of electrochemical cell 210, the pH of the solution circulating in anolyte loop 102 decreases as hydrogen ions are generated. In the exemplary embodiment of the NaClO$_2$ reactant feedstock, when the pH goes below 5, additional reactant feedstock is added using PLC system 108. Control of pH can also be handled by adding a reactant that decreases the pH when pH may is too high.

As further described in the '681 application, in another embodiment, the transfer line from gas transfer pump 216 can be connected to absorber tank 402 directly without injection line 406, and can allow for increasing the transfer rate of the pump. Other embodiments can include a different method of monitoring the liquid level in absorber tank 402. For example, an oxidation and reduction potential (ORP) can be dipped in absorber tank 402. ORP can be used to monitor the concentration of ClO$_2$ in the solution in absorber tank 402. PLC system 108 can be used to set a concentration level for the ClO$_2$ as monitored by ORP, which provides an equivalent method of controlling the liquid level in absorber tank 402. Optical techniques such as photometers can also be used to control the liquid level in absorber tank 402. Absorption loop 106 can be a part of the chlorine dioxide solution generator or it can be installed as a separate unit outside of the chlorine dioxide solution generator. In another embodiment, process water can be fed directly in absorber tank 402 and treated water can be removed from the absorber tank 402. The process water can include a demineralized, or soft, water source 420 and the process water feed can be controlled using a solenoid valve 422.

The process flow illustrated in FIGS. 1, 2 and 3 of the '681 application are based on ClO$_2$ gas produced using electrochemical cells and a sodium chlorite solution. ClO$_2$ gas can be made using many different processes that would be familiar to a person skilled in water treatment technologies. Such processes include, but are not limited to, acidification of chlorite, oxidation of chlorite by chlorine, oxidation of chlorite by persulfate, use of acetic anhydride on chlorite, use of sodium hypochlorite and sodium chlorite, use of dry chlorine/chlorite, reduction of chlorates by acidification in the presence of oxalic acid, reduction of chlorates by sulfur dioxide, and the ERCO R-2®, R-3®, R-5®, R-8®, R-10® and R-11® processes.

It has been determined that the material, the diameter, as well as the relative configuration and arrangement of the conduits (or pipes or tubes) associated with the present chlorine dioxide solution generator are important for safe, efficient and reliable operation of the generator. In particular, the $ClO_2$ gas stream should be removed the generator at temperature greater than about 163° F. (73° C.), depending upon the diameter of the conduit or tube through which the $ClO_2$ gas stream is carried.

As previously stated, it is known that $ClO_2$ at a temperature greater than about 163° F. (73° C.) can decompose to form chlorine and oxygen. Such decomposition is typically accompanied by an increase in the temperature of the $ClO_2$ stream, with temperatures as high 280° F. (138° C.), which is greater than the melting temperature of both PVC and CPVC (chlorinated poly(vinyl chloride)). PVC and CPVC are the typical materials from which the fluid stream conduits or pipes employed in chlorine dioxide solution generators, and the melting of those conduits can create hazardous operating conditions. It is therefore important to reduce and maintain the temperature of the chloride dioxide stream exiting the generator as low as possible.

Figure 5A:
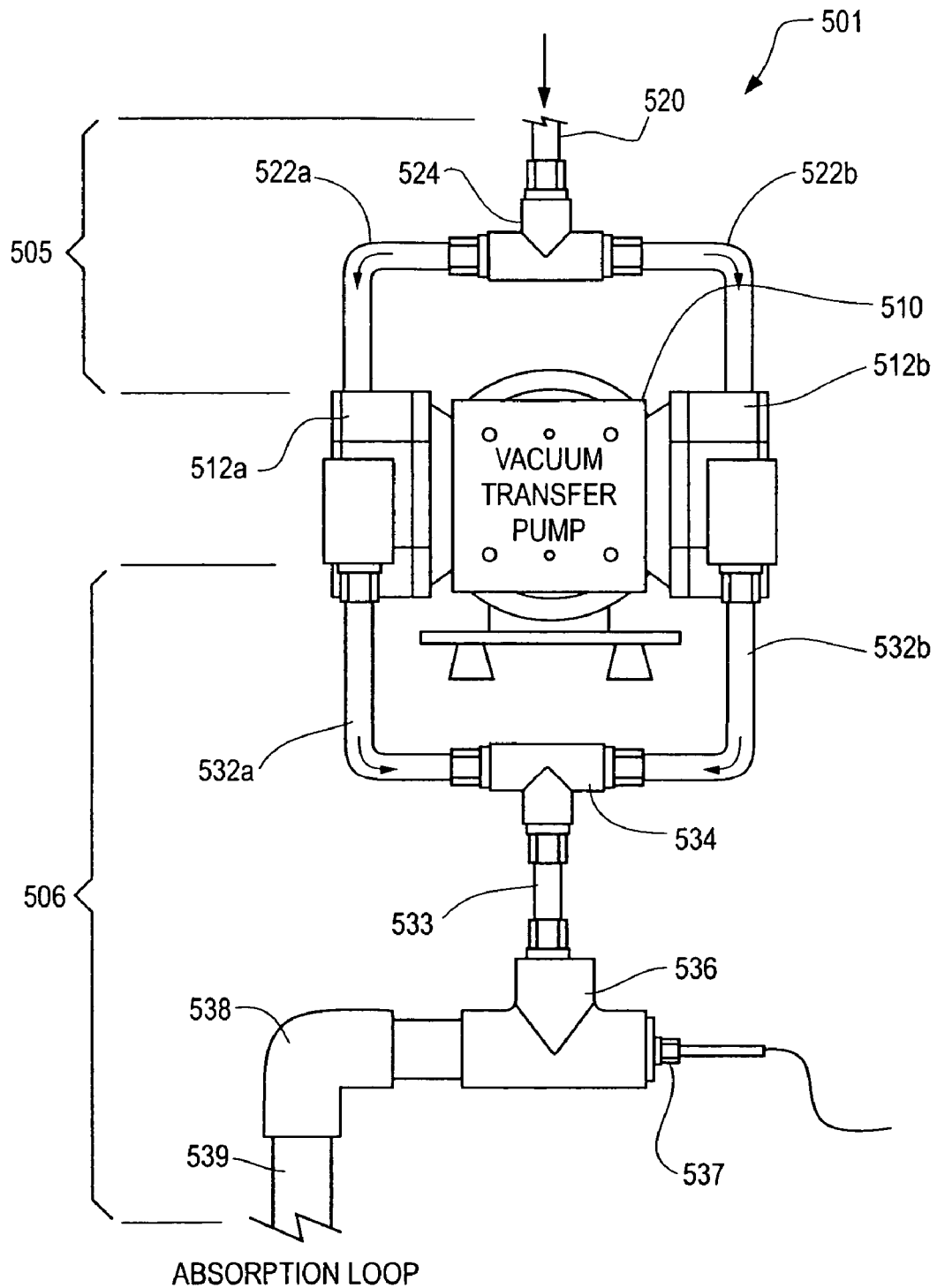
FIG. 5a is a top view of a $ClO_2$ gas stream pump configuration in a $ClO_2$ solution generator, but without the temperature control capability of the present technique.

FIG. 5a shows a $ClO_2$ gas stream pump configuration 501 in a $ClO_2$ solution generator, but without the temperature control capability of the present technique. Pump configuration 501 is interposed between a $ClO_2$ gas source of the type illustrated in FIGS. 1 and 2, and an absorption loop of the type illustrated in FIGS. 1 and 4.

Pump configuration 501 includes a gas transfer pump 510 interposed between an inlet manifold assembly 505 and an exhaust manifold assembly 506. Gas transfer pump 510 has two head portions 512a and 512b, which produce a pressurized gas stream from an incoming gas stream. A $ClO_2$ gas stream from a $ClO_2$ gas source (not shown) is directed to pump 510 via conduit 520, which branches at T-connector 524 to a pair of inlet conduits 522a, 522b. The $ClO_2$ gas stream in inlet conduit 512a is fed to pump head 512a, where the stream is pressurized and discharged from pump head 512a via outlet conduit 532a. Similarly, the $ClO_2$ gas stream in inlet conduit 512b is fed to pump head 512b, where the stream is pressurized and discharged from pump head 512b via outlet conduit 532b. The pressurized $ClO_2$ gas streams directed through outlet conduits 532a, 532b are combined into one stream at T-connector 534, and the combined stream is then directed through conduit 533 to a fitting 536, in which a thermocouple 537 is mounted and from which the combined stream is directed to the absorption loop (not shown) via conduit 539 and intermediate pipe connections and fittings, one of which is illustrated in FIG. 5a as elbow fitting 538.

Figure 5B:
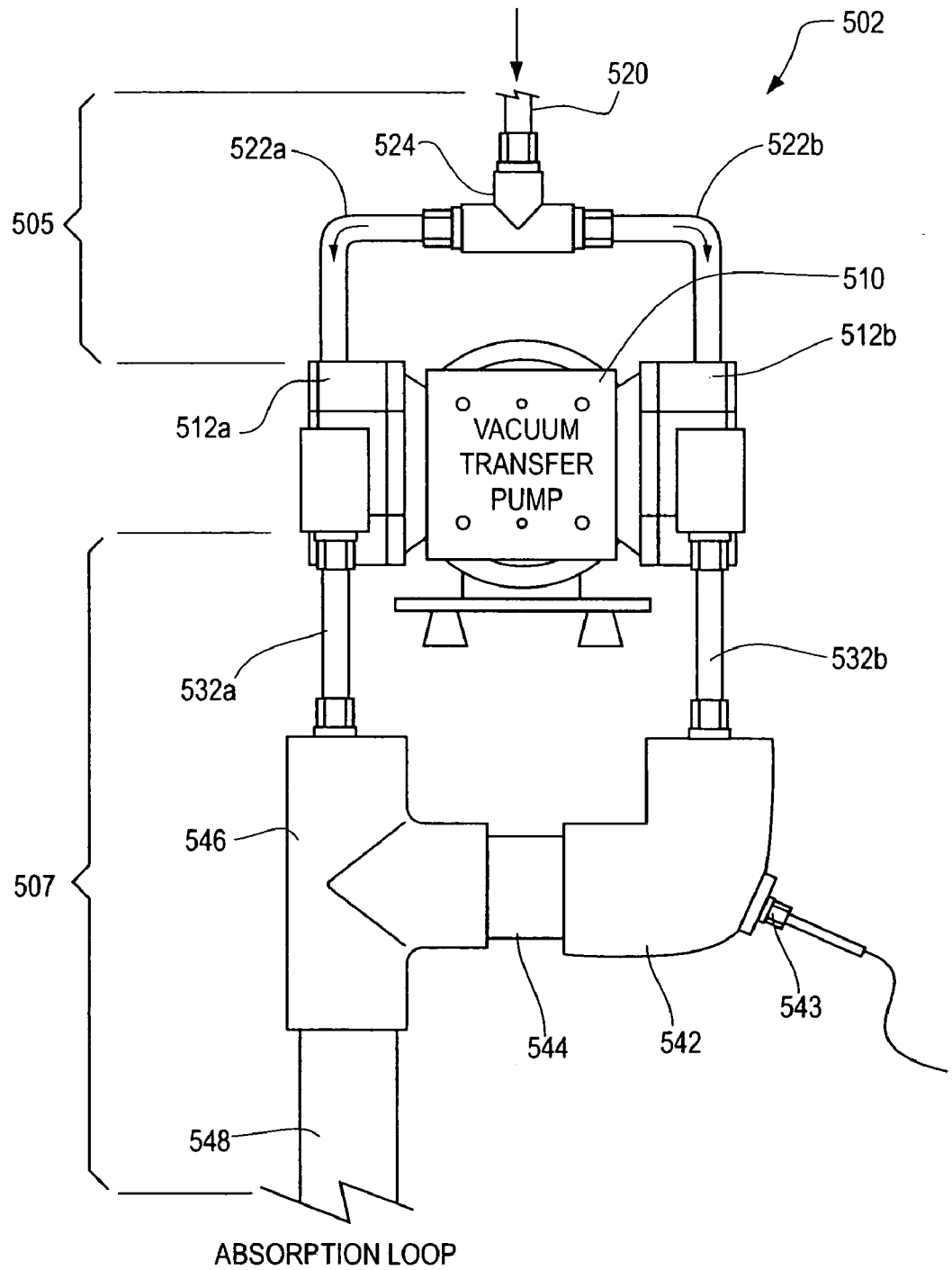
FIG. 5b is a top view of a first embodiment of a $ClO_2$ gas stream pump configuration for a $ClO_2$ solution generator having temperature control capability.

FIG. 5b shows an embodiment of a $ClO_2$ gas stream pump configuration 502 for a $ClO_2$ solution generator having temperature control capability. As with pump configuration 501 in FIG. 5a, pump configuration 502 is interposed between a $ClO_2$ gas source of the type illustrated in FIGS. 1 and 2, and an absorption loop of the type illustrated in FIGS. 1 and 4.

Pump configuration 502 includes gas transfer pump 510, an inlet manifold assembly 505, which as illustrated in FIG. 5b is essentially identical to the inlet manifold assembly shown in FIG. 5a. Pump configuration 502 also includes an exhaust manifold assembly 507, in which the inlet streams are pressurized and discharged from pump heads 512a, 512b via outlet conduits 532a, 532b, respectively. The pressurized $ClO_2$ gas streams directed through outlet conduits 532a, 532b are separately directed to conduits in which the pressurized streams undergo volumetric expansion. Thus, the pressurized $ClO_2$ gas stream in outlet conduit 532a is directed to and expanded within a T-connector 546, and the pressurized $ClO_2$ gas stream in outlet conduit 532b is directed to an elbow fitting 542, in which a thermocouple 537 is mounted and from which the stream is directed through conduit 544. The stream directed through conduit 544 is combined with the other pressurized and expanded $ClO_2$ gas stream at T-connector 546, and the combined stream is then directed from T-connector 546 to the downstream absorption loop via conduit 548 (and intermediate pipe connections and fittings, if any (not shown in FIG. 5b)).

Figure 5C:
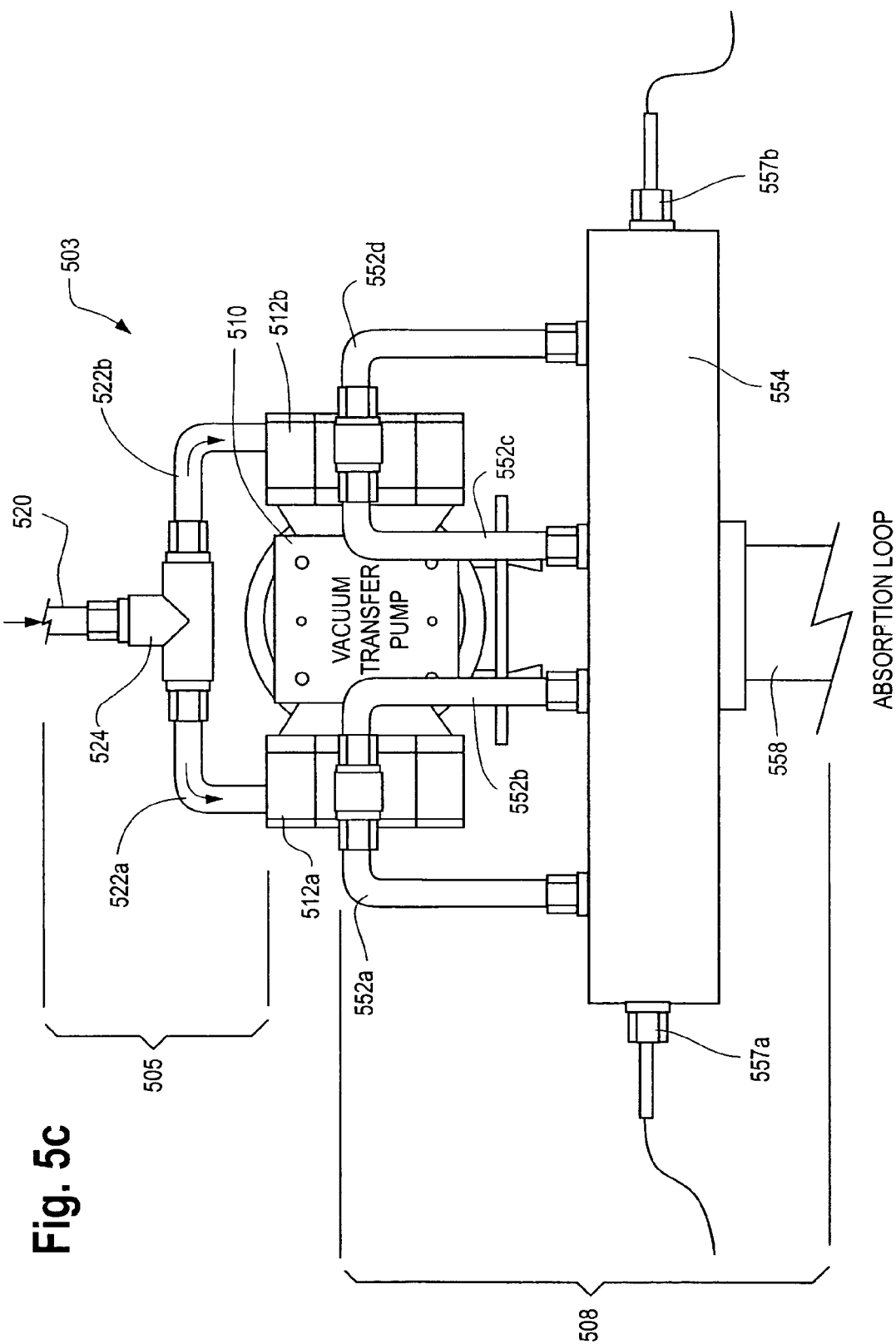
FIG. 5c is a top view of a second embodiment of a $ClO_2$ gas stream pump configuration for a $ClO_2$ solution generator having temperature control capability.

FIG. 5c shows an embodiment of a $ClO_2$ gas stream pump configuration 503 for a $ClO_2$ solution generator having temperature control capability. As with pump configuration 501 in FIG. 5a and pump configuration 502 in FIG. 5b, pump configuration 503 is interposed between a $ClO_2$ gas source of the type illustrated in FIGS. 1 and 2, and an absorption loop of the type illustrated in FIGS. 1 and 4.

Pump configuration 503 includes gas transfer pump 510, an inlet manifold assembly 505, which as illustrated in FIG. 5c is essentially identical to the inlet manifold assembly shown in FIGS. 5a and 5b. Pump configuration 503 also includes an exhaust manifold assembly 508, in which the inlet streams are pressurized and discharged from pump head 512a via outlet conduits 552a, 552b and from pump head 512b via outlet conduits 552c, 552d. The pressurized $ClO_2$ gas streams directed through outlet conduits 552a, 552b, 552c, 552d are separately directed to a single conduit 554, in which the pressurized streams are combined and undergo volumetric expansion. The stream directed through conduit 554 is then directed to the downstream absorption loop (not shown) via conduit 558 (and intermediate pipe connections and fittings, if any). Thermocouples 557a, 557b are mounted on opposite ends of conduit 544.

Figure 6:
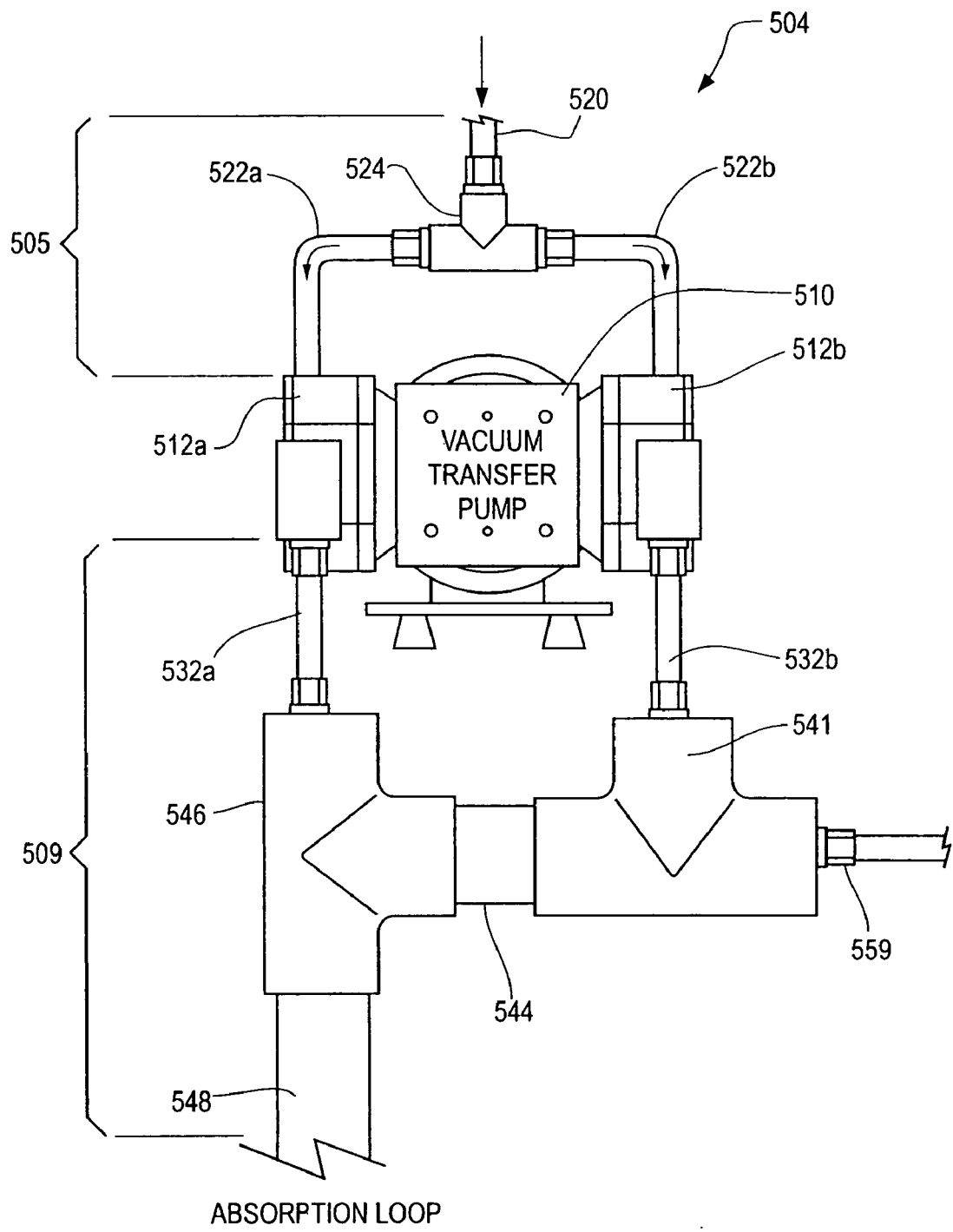
FIG. 6 is a top view of an embodiment of a $ClO_2$ gas stream pump configuration for a $ClO_2$ solution generator having temperature control capability, similar to the embodiment illustrated in FIG. 5b, but in which a water stream is mixed with the $ClO_2$ stream to further control the temperature of the $ClO_2$ stream before introducing the mixed stream to the absorption loop.

FIG. 6 shows a $ClO_2$ gas stream pump configuration 504 for a chlorine dioxide solution generator having temperature control capability, which is similar to the embodiment illustrated in FIG. 5b, but in which a water stream directed through conduit 559 is mixed with a pressurized $ClO_2$ gas stream to control the temperature of the $ClO_2$ stream(s) before introducing the mixed stream(s) to the absorption loop.

EXAMPLE 1

The $ClO_2$ gas stream exiting the pump orifice in FIGS. 5a, 5b and 5c, which has a diameter of 0.25 inch (0.64 cm) can be cooled by expanding the volume of the gas stream. The extent of expansion should be such that the induction period for decomposition of $ClO_2$ at the temperature and pressure indicated is greater than 20 seconds. According to published graphs in the technical literature (see, for example, Loss Prevention Bulletin, I. Chem. E. 113, October 1993 by G. Cowley), the temperature and induction period for 5 percent by volume of $ClO_2$ in air (corresponds to a partial pressure of 38 mm of Hg) shown in Table 1 below.

TABLE 1

| Induction period to decomposition of $ClO_2$ (5% by volume in air) at a partial pressure of 38 mm Hg | |
|---|---|
| Temperature (° F./° C.) | Induction Period (minutes) |
| 163/73 | 0.33 |
| 124/51 | 60 |
| 106/41 | 400 |

In the present chlorine dioxide solution generator with temperature control capability, the $ClO_2$ temperature is preferably reduced to and maintained at below 163° F. (73° C.). This can be accomplished in several ways, as illustrated with reference to the embodiments of FIGS. 5a, 5b and 5c. The temperatures of the pressurized $ClO_2$ gas streams were measured at thermocouple 537 (in the embodiment of FIG. 5a), at thermocouple 543 (in the embodiment of FIG. 5b), and at thermocouple 557b (in the embodiment of FIG. 5c). The operating data is shown in Table 2 below.

TABLE 2

Temperature of ClO$_2$ for various nominal diameters of the conduits depicted in FIGS. 5a, 5b and 5c

| FIG. | Conduit | | | | | | | | Temp (° F./ ° C.) |
|------|---------|---------|---------|---------|---------|---------|---------|---------|---------|
| | 532a (in/cm) | 532b (in/cm) | 532c (in/cm) | 532d (in/cm) | 533 (in/cm) | 539 (in/cm) | 544 (in/cm) | 554 (in/cm) | |
| 5a | 0.50/1.27 | 0.50/1.27 | — | — | 0.50/1.27 | 1.00/2.54 | — | — | >280/>138 |
| 5b | 0.50/1.27 | 0.50/1.27 | — | — | — | — | 1.00/2.54 | — | 162/72 |
| 5b | 0.75/1.91 | 0.75/1.91 | — | — | — | — | 2.00/5.08 | — | 153/67 |
| 5b | 0.75/1.91 | 0.75/1.91 | — | — | — | — | 1.00/2.54 | — | 151/66 |
| 5c | 0.50/1.27 | 0.50/1.27 | 0.50/1.27 | 0.50/1.27 | — | — | — | 2.00/5.08 | 153/67 |

The data in Table 2 show that increasing the diameter of the conduit carrying the ClO$_2$ stream induces a reduction in the temperature of the stream.

Another way of reducing the temperature of the ClO$_2$ stream is to introduce water at the conduit, such as, for example, the conduit formed in T-connector 541 shown in FIG. 6, in which a water stream is mixed with the ClO$_2$ stream to control the temperature of the ClO$_2$ stream before introducing the mixed stream to the vacuum gas transfer pump.

While particular elements, embodiments and applications of the present invention have been shown and described, it will be understood, of course, that the invention is not limited thereto since modifications can be made by those skilled in the art without departing from the scope of the present disclosure, particularly in light of the foregoing teachings.

What is claimed is:

1. A chlorine dioxide solution generator comprising:
   (a) a chlorine dioxide gas source;
   (b) an absorption loop for effecting the dissolution of chlorine dioxide into a liquid stream, said absorption loop fluidly connected to said chlorine dioxide gas source; and
   (c) a gas transfer assembly interposed between said chlorine dioxide gas source and said absorption loop, said gas transfer assembly comprising:
      (1) a gas transfer pump having at least one inlet port for receiving a chlorine dioxide gas stream from said chlorine dioxide gas source and at least one outlet port for discharging a pressurized chlorine dioxide gas stream; and
      (2) an exhaust manifold assembly extending from said at least one gas transfer pump outlet port, said exhaust manifold assembly comprising at least one manifold conduit defining an interior volume for directing said pressurized chlorine dioxide gas stream from said at least one gas transfer pump outlet port to said absorption loop, wherein said at least one manifold conduit interior volume is sufficiently large to inhibit chlorine dioxide decomposition in said pressurized chlorine dioxide gas stream by inducing a pressurized chlorine dioxide gas stream temperature within said at least one manifold conduit of less than about 163° F. (73° C.), wherein said gas transfer pump has first and second inlet ports for receiving first and second chlorine dioxide gas streams from said chlorine dioxide gas source, wherein said gas transfer pump has first and second outlet ports for discharging first and second pressurized chlorine dioxide gas streams, and wherein said exhaust manifold assembly comprises first and second manifold conduits defining an aggregate manifold conduit interior volume for directing said first and second pressurized chlorine dioxide gas streams, respectively, from said gas transfer pump to said absorption loop, wherein said aggregate manifold conduit interior volume is sufficiently large to inhibit chlorine dioxide decomposition in said first and second pressurized chlorine dioxide gas streams.

2. The chlorine dioxide solution generator of claim 1 wherein said first and second inlet ports each has an inlet port conduit extending therefrom for receiving first and second chlorine dioxide gas streams from said chlorine dioxide gas source, wherein said first and second outlet ports each has an outlet port conduit extending therefrom for discharging first and second pressurized chlorine dioxide gas streams, and wherein said exhaust manifold assembly comprises first and second manifold conduits defining an aggregate manifold conduit interior volume for directing said first and second pressurized chlorine dioxide gas streams, respectively, from said gas transfer pump to said absorption loop, wherein said aggregate manifold conduit interior volume is sufficiently large to inhibit chlorine dioxide decomposition in said first and second pressurized chlorine dioxide gas streams.

3. The chlorine dioxide solution generator of claim 2 wherein said outlet port conduits are formed from a material having a melting point greater than about 140° F. (60° C.).

4. The chlorine dioxide solution generator of claim 3 wherein said outlet port conduits are formed from a material selected from the group consisting of polytetrafluoroethylene, polychlorotrifluoroethylene, chlorinated poly(vinyl chloride), titanium and other metals having a melting point greater than about 140° F. (60° C.).

5. The chlorine dioxide solution generator of claim 1 wherein said first and second inlet ports each has an inlet port conduit extending therefrom for receiving first and second chlorine dioxide gas streams from said chlorine dioxide gas source, wherein said first and second outlet ports each has a pair of outlet port conduits extending therefrom for discharging two pairs of pressurized chlorine dioxide gas streams, and wherein said exhaust manifold assembly comprises at least one manifold conduit defining an aggregate manifold conduit interior volume for directing said first and second pressurized chlorine dioxide gas streams, respectively, from said gas transfer pump to said absorption loop, wherein said aggregate manifold conduit interior volume is sufficiently large to inhibit chlorine dioxide decomposition in said first and second pressurized chlorine dioxide gas streams.

6. The chlorine dioxide solution generator of claim 5 wherein said outlet port conduits are formed from a material having a melting point greater than about 140° F. (60° C.).

7. The chlorine dioxide solution generator of claim 6 wherein said outlet port conduits are formed from a material selected from the group consisting of polytetrafluoroethylene, polychlorotrifluoroethylene, chlorinated poly(vinyl chloride), titanium and other metals having a melting point greater than about 140° F. (60° C.).

8. The chlorine dioxide solution generator of claim 5 wherein said exhaust manifold assembly comprises a single manifold conduit defining an interior volume for directing said two pairs of pressurized chlorine dioxide gas streams from said gas transfer pump to said absorption loop, wherein said interior volume is sufficiently large to inhibit chlorine dioxide decomposition in said pressurized chlorine dioxide gas stream.

* * * * *